H. O. AND W. L. EKERN.
GREASE GUN.
APPLICATION FILED JULY 3, 1919.

1,321,020.

Patented Nov. 4, 1919.
6 SHEETS—SHEET 1.

WITNESSES
George C. Myers.
C. E. Sisson

INVENTOR
H. O. EKERN,
W. L. EKERN,
BY
ATTORNEYS

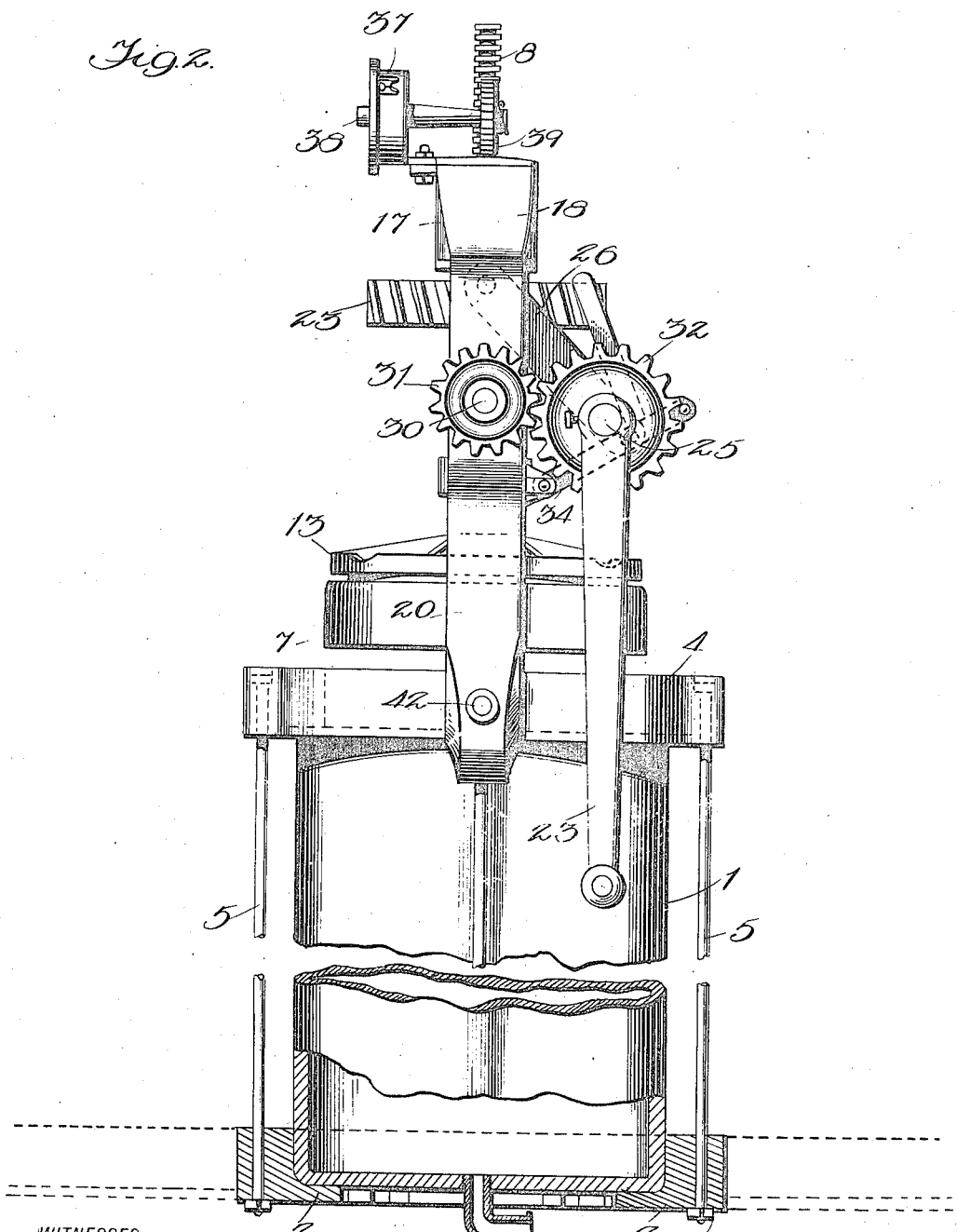

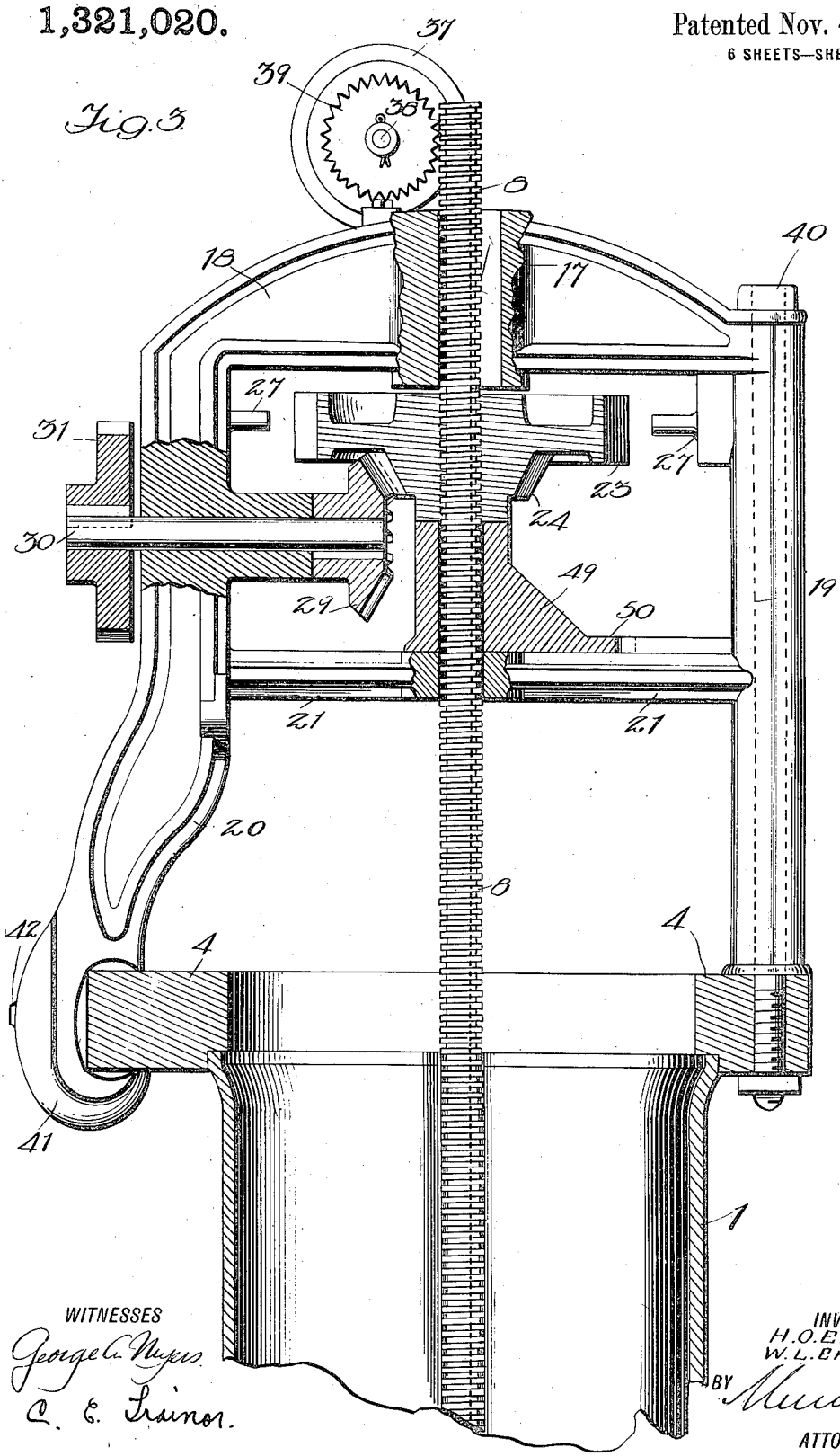

H. O. AND W. L. EKERN.
GREASE GUN.
APPLICATION FILED JULY 3, 1919.
1,321,020.
Patented Nov. 4, 1919.
6 SHEETS—SHEET 4.
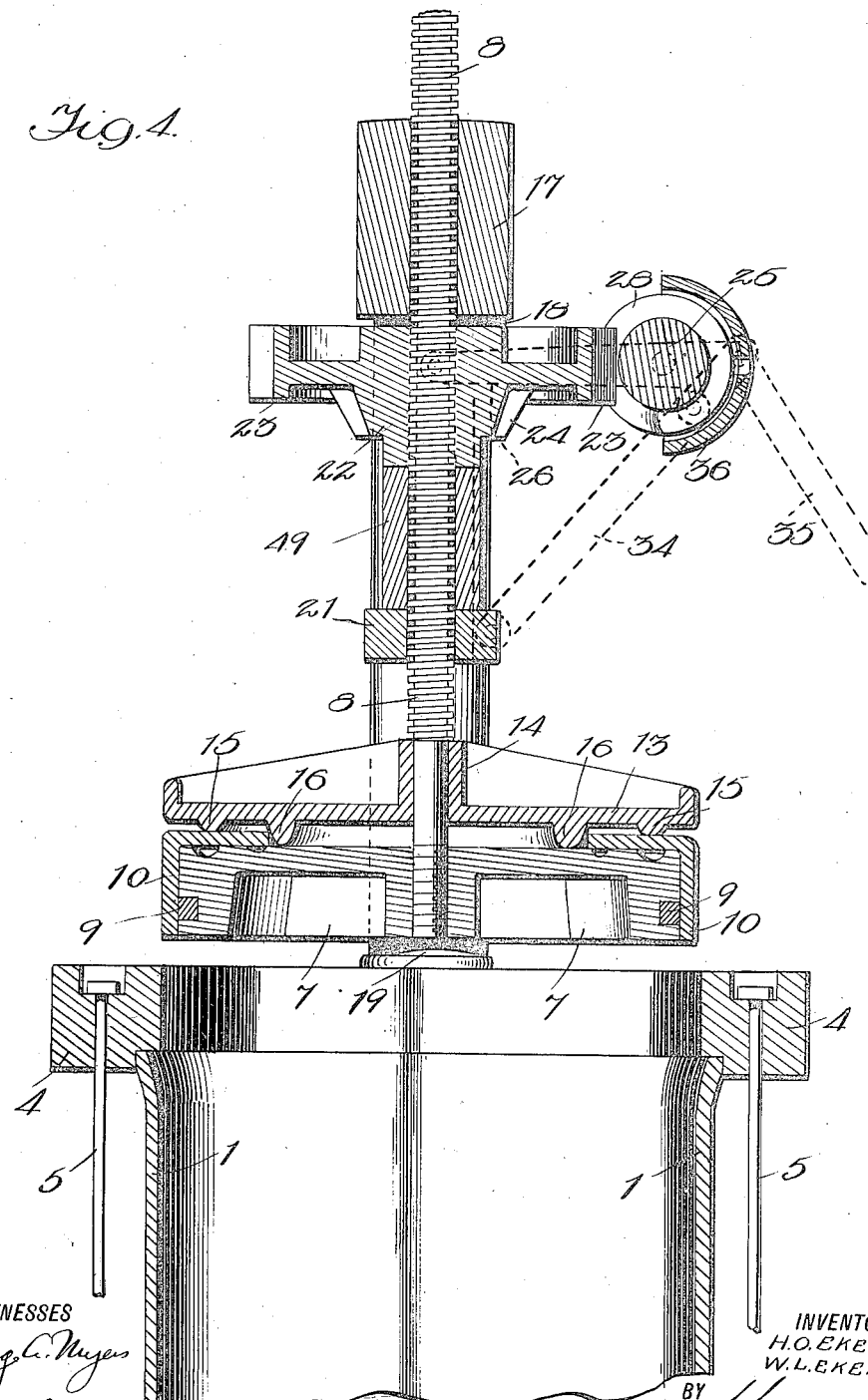

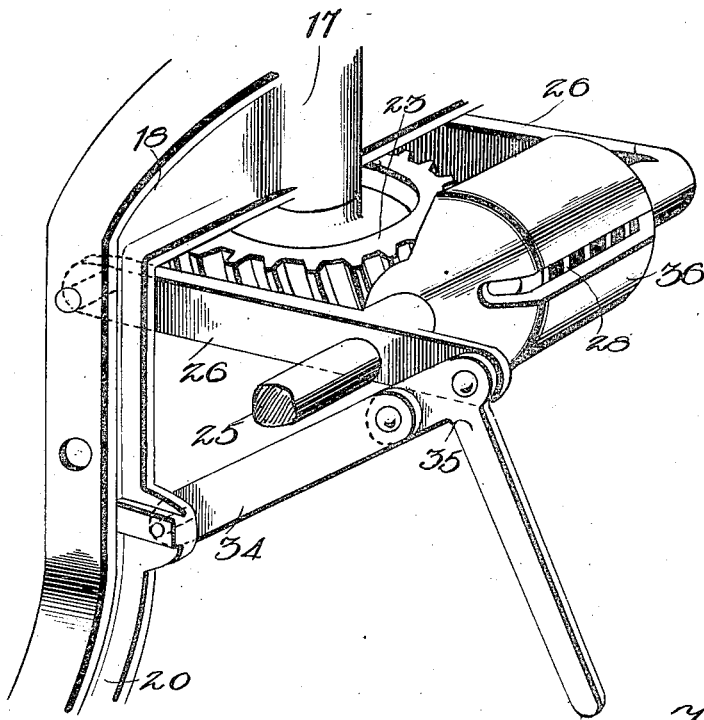
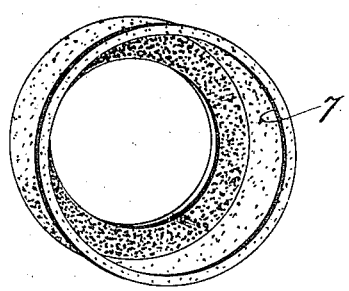
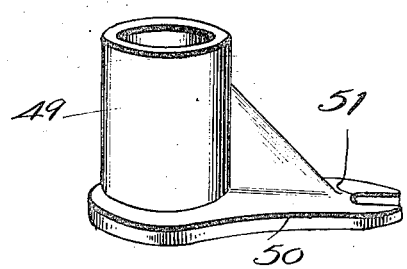

H. O. AND W. L. EKERN.
GREASE GUN.
APPLICATION FILED JULY 3, 1919.
1,321,020.
Patented Nov. 4, 1919.
6 SHEETS—SHEET 6.
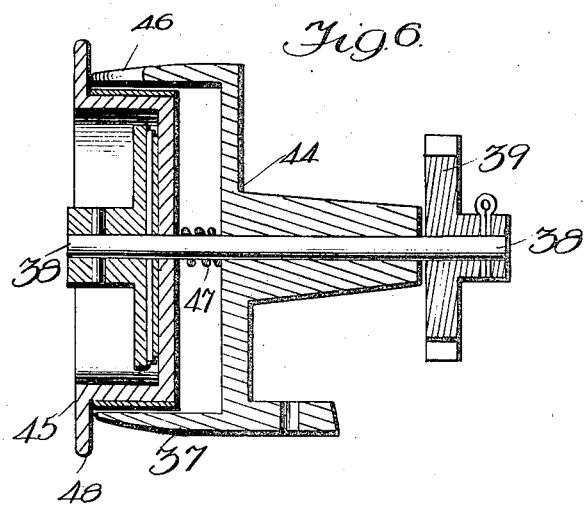
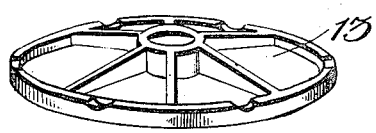
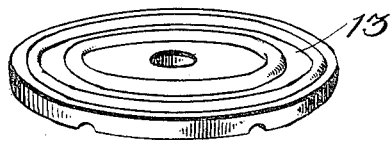
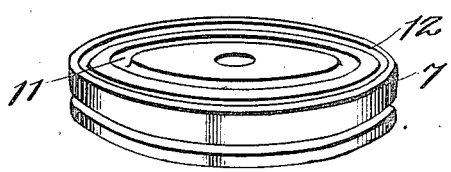
WITNESSES
INVENTOR
H. O. EKERN,
W. L. EKERN,
BY
ATTORNEYS

UNITED STATES PATENT OFFICE.

HELMER O. EKERN AND WILLIE L. EKERN, OF FLANDREAU, SOUTH DAKOTA, ASSIGNORS TO EKERN BROS. MFG. CO., OF FLANDREAU, SOUTH DAKOTA, A CORPORATION OF SOUTH DAKOTA.

GREASE-GUN.

1,321,020.             Specification of Letters Patent.          Patented Nov. 4, 1919.

Application filed July 3, 1919. Serial No. 308,404.

*To all whom it may concern:*

Be it known that we, HELMER O. EKERN and WILLIE L. EKERN, citizens of the United States, and residents of Flandreau, in the county of Moody and State of South Dakota, have invented certain new and useful Improvements in Grease-Guns, of which the following is a specification.

Our invention is an improvement in grease guns, and has for its object to provide a new and improved gun of the character specified especially adapted for use as a portable garage gun, for forcibly ejecting heavy oils and greases, such as are used for lubricating the transmissions and differentials of motor vehicles.

In the drawings:

Fig. 2 is a view at right angles to Fig. 1;

Fig. 3 is a vertical section of the gun;

Fig. 4 is a similar view taken at right angles to the section of Fig. 3;

Fig. 5 is a perspective view of the gearing;

Fig. 6 is a sectional view through the indicator;

Fig. 7 is a view of the disk looking from above and from below in perspective;

Fig. 8 is a perspective view of the piston and piston ring separated;

Fig. 9 is a perspective view of the spacing sleeve for the nut;

Fig. 10 is a perspective view of the leather packing for the piston.

Figure 1:
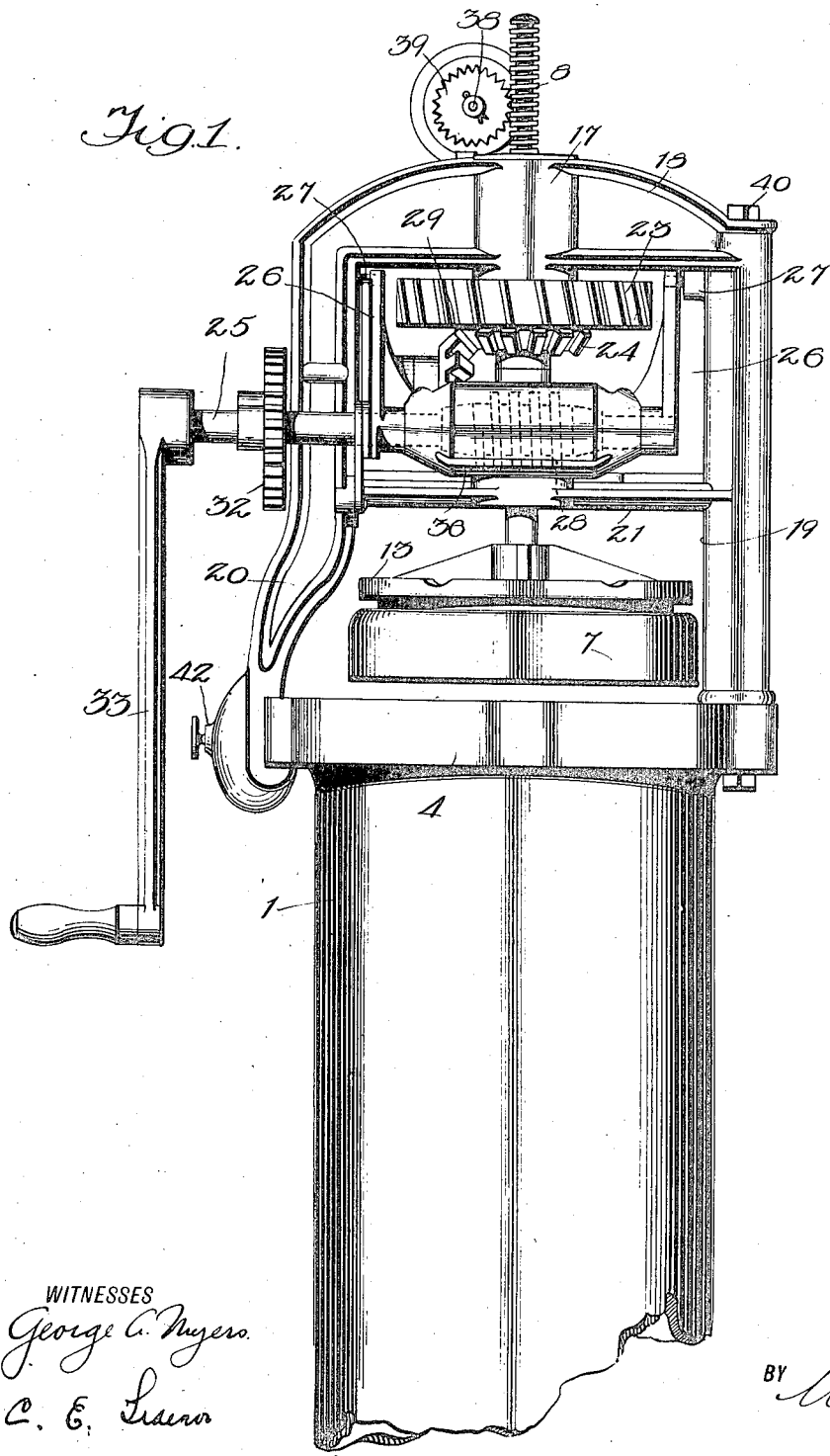
Figure 1 is a front view of the improved gun.

In the embodiment of the invention shown the cylinder or barrel 1 of the gun is supported by a base 2, the said base being recessed as shown in Fig. 2, to receive the closed lower end of the cylinder, and the discharge nipple 3 of the gun extends through an opening in the base and is adapted for connection with a suitable hose, to conduct the grease to the point of utilization.

A ring 4 is arranged at the top of the barrel, the said ring being rabbeted, as shown in Fig. 3, to receive the barrel, and bolts 5 connect the ring with the base, the ring having radial lugs for engagement by the bolts, and the bolts are engaged by nuts 6 below the base. Referring to Fig. 4, it will be seen that the heads of the bolts are countersunk in the ring. The plunger 7 for the barrel is connected to the lower end of a screw 8, and the said plunger has an annular peripheral groove for receiving a piston or packing ring 9.

As shown in Fig. 4, the plunger has threaded engagement with the plain lower end of the screw. This plunger is provided with a packing 10 of leather or the like, the said packing embracing the plunger outside of the ring 9 and the top of the plunger near the peripheral edge.

Referring to Fig. 8, it will be seen that the plunger has annular grooves 11 and 12 beneath the leather packing, and a disk 13 rests upon the top of the plunger and on that portion of the packing which is horizontal. This disk has a hub 14 which fits the plain portion of the screw 8, and the disk has annular ribs 15 and 16 on its under face which engage the leather packing and the plunger, respectively.

The screw 8 is journaled in a bearing 17 in the body 18 of a yoke, consisting of the said body and arms 19 and 20, and in a bearing in a cross bar 21 connecting the arms. Between the body of the yoke and the cross bar 21 and adjacent to the body of the yoke, a nut 22 is threaded on to the rod, and this nut carries a gear wheel 23 and a bevel pinion 24 below the gear wheel.

A shaft 25 is journaled in a pair of arms 26, which are pivoted to the arms 19 and 20, as indicated at 27, in such manner that the shaft 25 may be swung up into engagement with the gear wheel 23, as shown in Fig. 4, or downward into the position of Fig. 1.

The shaft has a worm 28 which is adapted to mesh with the gear wheel 23 which is a worm wheel. When the shaft 25 is in the position of Fig. 4 the nut will be rotated through the gear wheel, while when the shaft is in the position of Fig. 1 it will be rotated through gearing to be described. The bevel gear 24 is engaged by a gear 29 on a countershaft 30 which is journaled in the arm 20 of the yoke. This countershaft carries at its outer end a pinion 31 which is adapted to mesh with a pinion 32 on the shaft 25, when the said shaft is in the position of Figs. 1 and 2.

The shaft 25 carries a crank 33 at one end for convenience in rotating the same. When the shaft 25 is swung into the position of Fig. 4 it is held in such position by means of a brace 34. This brace is pivoted at one end to the arm 20 and at the other to the short arm of an elbow lever 35 which is pivoted to one of the arms 26 before mentioned. The other arm 26 carries a housing 36 for the worm 28, and, referring to Fig. 5, it will be seen that this housing is slotted longitudinally at its front to permit inspection of the worm and to permit the insertion of lubricant.

The indicator, indicated generally at 37, is arranged above the body 18 of the yoke. The shaft 38 of this indicator, and whose rotation controls the indicator, is provided with a toothed wheel 39, which is engaged by the screw 8. The arrangement is such that the indicator will indicate the amount of grease driven out by the downward movement of the plunger through the movement of the screw. The yoke is connected to the ring 4 by means of a bolt 40 which passes downwardly through a bore in the arm 19 of the yoke, and is threaded into an opening in the ring. The arm 20 has a hook 41 for engaging one of the radial lugs of the ring. A set screw 42 is threaded through this hook into engagement with the ring for securing the parts in place.

Referring to Fig. 6, it will be noticed that a housing 44 is provided for the shaft 38 and the wheel 45 of the register, the said housing having an opening 46 through which the indications on the wheel are visible. A coil spring 47 is arranged between the housing and the wheel and normally acts to press the wheel outward. The wheel has a flange 48 at its outer edge, which coöperates with the housing to complete the closure.

The nut 24 is held from downward movement by a sleeve 49 which rests at its lower end on the cross bar 21. This sleeve 49 has a radial lug 50 at its lower end, which is notched, as shown at 51. A screw may be passed through this notch to hold the sleeve from turning, the screw engaging the cross bar 21.

We claim:

1. In combination, a grease gun including a substantially cylindrical casing, a screw movable longitudinally within the casing and carrying a plunger, the casing having an outlet at its lower end for the grease, a nut through which the screw is threaded and means for rotating the nut, a supporting frame for the said rotating means having means for detachably engaging the top of the casing to connect the rotating means for the nut thereto, said rotating means including an operating shaft, and a two-speed connection between the operating shaft and the nut for rotating said nut at various speeds, and means for bringing either connection into use.

2. In a grease gun, a casing and a plunger movable longitudinally thereof, a screw connected with the plunger, a nut threaded on to the plunger, a supporting frame for connection with the end of the casing, an operating shaft, a two-speed connection between the operating shaft and the nut, said connection comprising a countershaft, a worm gear connection between the countershaft and the nut, a gearing for driving the nut at a lower level, said countershaft carrying a gear for engaging said gearing, and means for swining the countershaft to bring the worm gear or the gearing in to mesh.

3. In a rease gun, a casing and a plunger movable longitudinally thereof, a screw connected with the plunger, a nut threaded on to the plunger, a supporting frame for connection with the end of the casing, an operating shaft, and a two-speed connection between the operating shaft and the nut.

4. In a grease gun, a casing and a plunger movable longitudinally thereof, a screw connected with the plunger, a nut threaded on to the plunger, a supporting frame for connection with the end of the casing, an operating shaft, and a two-speed connection between the operating shaft and the nut, and means for bringing either connection into operative position.

HELMER O. EKERN.
WILLIE L. EKERN.